United States Patent
Mima

(10) Patent No.: US 11,519,722 B2
(45) Date of Patent: Dec. 6, 2022

(54) POSITION DETECTION SYSTEM AND POSITION DETECTION METHOD FOR DETECTING POSITION OF OBJECT

(71) Applicant: Panasonic Intellectual Property Management Co., Ltd., Osaka (JP)

(72) Inventor: Kunihiro Mima, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 274 days.

(21) Appl. No.: 16/892,750

(22) Filed: Jun. 4, 2020

(65) Prior Publication Data

US 2020/0386542 A1 Dec. 10, 2020

(30) Foreign Application Priority Data

Jun. 7, 2019 (JP) .............................. JP2019-107210

(51) Int. Cl.
*G01B 11/25* (2006.01)
*G01B 11/22* (2006.01)

(52) U.S. Cl.
CPC .......... *G01B 11/2513* (2013.01); *G01B 11/22* (2013.01); *G01B 11/2509* (2013.01); *G01B 11/2536* (2013.01)

(58) Field of Classification Search
None
See application file for complete search history.

(56) References Cited

U.S. PATENT DOCUMENTS

| | | | | |
|---|---|---|---|---|
| 2011/0050859 A1* | 3/2011 | Kimmel | ............. | G01B 11/2509 382/106 |
| 2013/0057707 A1* | 3/2013 | Hasegawa | ............. | H04N 9/3185 348/189 |
| 2016/0054118 A1* | 2/2016 | Fuchikami | ......... | G01B 11/2509 356/610 |
| 2016/0247287 A1* | 8/2016 | Inaba | ........................ | G06T 7/13 |

FOREIGN PATENT DOCUMENTS

| | | |
|---|---|---|
| JP | 60-152903 | 8/1985 |
| JP | 2007-155601 | 6/2007 |
| JP | 2015-180857 | 10/2015 |
| WO | 2015/133053 | 9/2015 |

* cited by examiner

*Primary Examiner* — Edemio Navas, Jr.
(74) *Attorney, Agent, or Firm* — Wenderoth, Lind & Ponack, L.L.P.

(57) ABSTRACT

A position detection system detects a position of an object by using a plurality of frames, each of the plurality of frames being divided into a plurality of subframes. The position detection system includes: a projector configured to project a plurality of gray code patterns having different gray code values in an order of ascending and then descending or descending and then ascending of the different gray code values, each of the plurality of gray code patterns corresponding to a corresponding one of the plurality of subframes, each of the different gray code values being a power of two; an imaging device configured to generate a captured image by, for each of the plurality of subframes, imaging the object on which the plurality of gray code patterns are projected; a controller configured to estimate the position of the object based on the captured image.

12 Claims, 7 Drawing Sheets

FIG. 4

| Subframe | 1 | 2 | 3 | 4 | 5 | 6 | 7 | 8 | 9 | 10 |
|---|---|---|---|---|---|---|---|---|---|---|
| Bit position in gray code pattern arrangement A | 1 | 2 | 3 | 4 | 5 | 6 | 7 | 8 | 9 | 10 |
| Bit position in gray code pattern arrangement B | 1 | 3 | 5 | 7 | 9 | 2 | 4 | 6 | 8 | 10 |
| Bit position in gray code pattern arrangement C | 10 | 9 | 8 | 7 | 6 | 5 | 4 | 3 | 2 | 1 |
| Bit position in gray code pattern arrangement D | 10 | 1 | 2 | 9 | 3 | 4 | 8 | 5 | 6 | 7 |
| Bit position in gray code pattern arrangement E | 9 | 3 | 4 | 8 | 5 | 6 | 7 | 10 | 1 | 2 |
| Bit position in gray code pattern arrangement F | 7 | 6 | 5 | 8 | 4 | 3 | 9 | 2 | 1 | 10 |

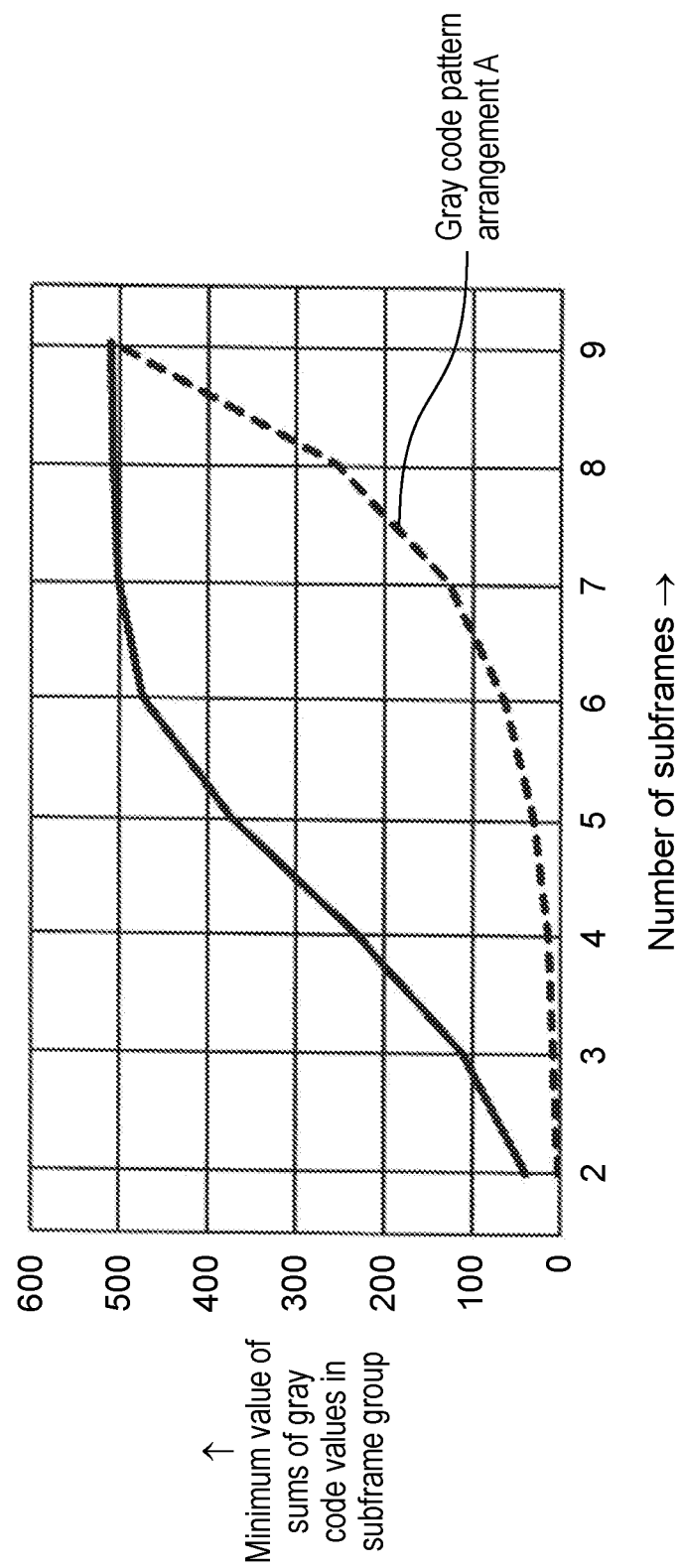

POSITION DETECTION SYSTEM AND POSITION DETECTION METHOD FOR DETECTING POSITION OF OBJECT

BACKGROUND

1. Technical Field

The present disclosure relates to a position detection system and a position detection method for detecting a position of an object, and more specifically relates to a position detection system and a position detection method for detecting a position of an object by making use of a space coding method using a binary projection pattern by which a code value is generated with respect to a space.

2. Description of Related Art

As techniques for measuring a three-dimensional form of a measurement target in a non-contact manner by the use of light, there are known, for example, a slit light projection method and a space coding method. In these methods, a measurement target is irradiated with light from a lighting projector, and reflected light is measured.

For example, Patent Literature 1 discloses a method for measuring a position of a three-dimensional measurement target according to a space coding method. The position measurement method according to Patent Literature 1 is performed in such a manner that a coded gray code pattern is projected onto a measurement target by the use of a projector, and the measurement target is imaged by an imaging device placed at a position different from a position of the projector, and the resulting image is binarized every pixel. This process is repeated for a plurality of gray code patterns, and, based on a plurality of binarized patterns resulting from the binarization, a position of the measurement target is calculated by trigonometry using a parallax between the projector and the imaging device.

Patent Literature 1 is Unexamined Japanese Patent Publication No. S60-152903.

SUMMARY

In recent years, in the field of automatic vehicle operation and interactive entertainment, for example, techniques to detect a measurement target at high speed for projection mapping, for example, have been demanded. However, in an order to measure the position of a measurement target with methods according to the prior arts, a plurality of subframe time periods for projecting gray codes is needed. Therefore, it is difficult to correctly detect the position of a measurement target that is moving at high speed.

For example, in the case of detecting a position of a measurement target moving at 100 km/h, even if it only takes a time period of 1/60 seconds to measure the three-dimensional form of the measurement target, the measurement target moves approximately 80 cm between the start time and the finish time of the measurement. Furthermore, for this detection, during the time period of 1/60 seconds, the same number of images as projection target patterns are projected and imaged, and the images are processed. However, there is a problem that, for the above-mentioned process, an imaging device capable of sufficiently high speed imaging and a processor capable of high-speed image processing are used, but, these devices are generally expensive.

The present disclosure discloses a system and a method that make it possible to detect an object at lower cost and higher speed, compared with the prior arts.

A position detection system according to one aspect of the present disclosure is a position detection system configured to detect a position of an object by using a plurality of frames, each of the plurality of frames being divided into a plurality of subframes. The position detection system includes: a projector configured to project a plurality of gray code patterns having different gray code values in an order of ascending and then descending or descending and then ascending of the different gray code values, each of the plurality of gray code patterns corresponding to a corresponding one of the plurality of subframes, each of the different gray code values being a power of two; an imaging device configured to generate a captured image by, for each of the plurality of subframes, imaging the object on which the plurality of gray code patterns are projected; a controller configured to estimate the position of the object based on the captured image. A position detection method according to one aspect of the present disclosure is a position detection method for a position detection system being configured to detect a position of an object by using a plurality of frames, each of the plurality of frames being divided into a plurality of subframes. The position detection method includes: arranging a plurality of gray code patterns having different gray code values in an order of ascending and then descending or descending and then ascending of the different gray code values, each of the plurality of gray code patterns corresponding to a corresponding one of the plurality of subframes, each of the different gray code values being a power of two; projecting the plurality of gray code patterns onto the object in the order; generating a captured image by, for each of the plurality of subframes, imaging the object on which the plurality of gray code patterns are projected; and estimating a position of the object based on the captured image.

The present disclosure makes it possible to detect an object at lower cost and higher speed, compared with the prior arts.

BRIEF DESCRIPTION OF DRAWINGS

FIG. 4 is a table of various examples of gray code pattern arrangements according to a conventional example, comparative examples, and Embodiment 1.

FIG. 7 illustrates graphs of relations between the number of subframes Nsfg, included in one subframe group and the minimum value of the sums of gray code values in Nsfg consecutive subframes, according to the conventional example and Embodiment 1.

DETAILED DESCRIPTION

Figure 1:
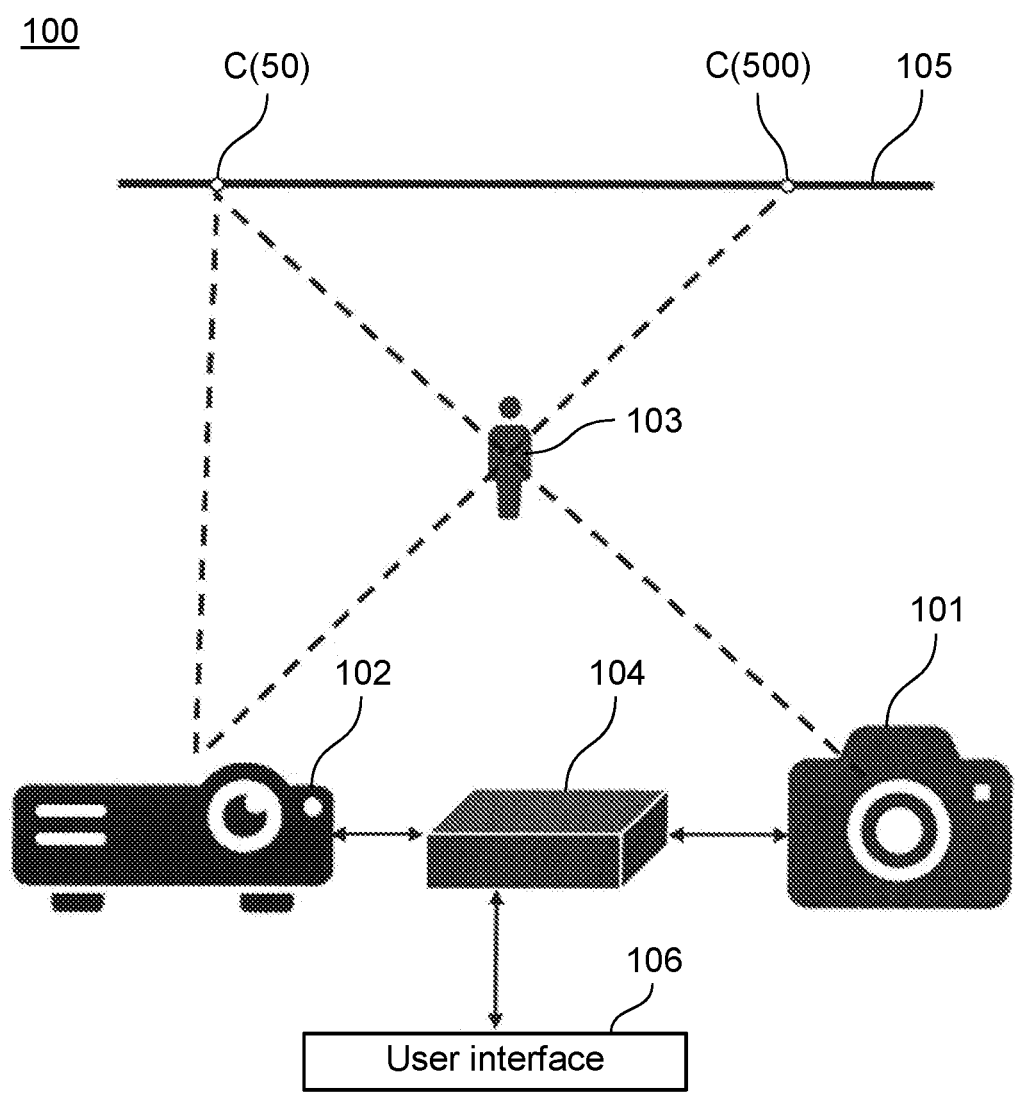
FIG. 1 is a block diagram illustrating a configuration example of position detection system 100 according to Embodiment 1.

FIG. 1 is a block diagram illustrating a configuration example of position detection system 100 according to Embodiment 1. In FIG. 1, position detection system 100 includes imaging device 101, projector 102, object 103, digital calculator 104, and wall 105. In position detection system 100 of FIG. 1, one frame includes 10 subframes. Position detection system 100 detects a position of the object by using a plurality of frames each divided into a plurality of subframes.

In FIG. 1, projector 102 is configured to, toward wall 105 and object 103, sequentially project gray code patterns 200a to 200j each for a corresponding one of the subframes. Imaging device 101 is configured to, for each of the subframes, image wall 105 and object 103 on which gray code patterns 200a to 200j are projected, and sequentially send captured image signals to digital calculator 104. Digital calculator 104 is a controller configured to determine whether or not object 103 is present within an imaging range, based on the captured image sent from the imaging device 101, and, if object 103 is present, estimate the depth of object 103 (a distance from wall 105). Of points on wall 105, point C (50) and point C (500) in FIG. 1 are a point with a gray code value of 50 and a point with a gray code value of 500, respectively.

A gray code value at a certain point on wall 105 means the sum of gray code values of gray code patterns out of gray code patterns 200a to 200j, the gray code patterns being projected in white on the point. Hence, a gray code value at a point on wall 105 is equal to a 10-digit binary number in which pixel values (each 0 or 1) of gray code patterns 200a to 200j at the point are values of the tenth to first bits, respectively. In the present embodiment, gray code patterns 200a to 200j are referred to as the tenth to the first gray code patterns, respectively.

Figure 2:
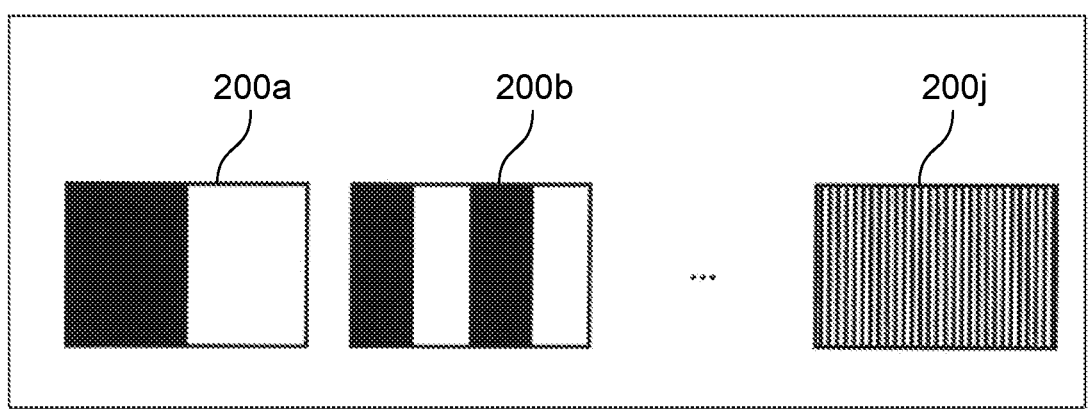
FIG. 2 is a front view illustrating examples of gray code patterns 200a to 200j used in position detection system 100 of FIG. 1.

FIG. 2 is a front view illustrating examples of gray code patterns 200a to 200j used in position detection system 100 of FIG. 1. Gray code patterns 200a to 200j are each a binary image having pixels each being black (0) or white (1). The highest-order, namely the tenth gray code pattern 200a is a pattern formed of a left half being 0 and a right half being 1, and has a gray code value of 512. The ninth gray code pattern 200b is a pattern formed of four parts obtained by laterally splitting a whole into four, the four parts being 0, 1, 0, and 1 respectively in an order from left to right, and has a gray code value of 256. Similarly, in the following bits, gray code patterns to be used are such that the width is reduced by half every bit increase. The lowest-order, namely the first gray code pattern 200j is a pattern in which 512 bars for 0 and 512 bars for 1 alternately appear, and has a gray code value of 1. Thus, gray code patterns 200a to 200j have different gray code values each being a power of two.

Figure 3:
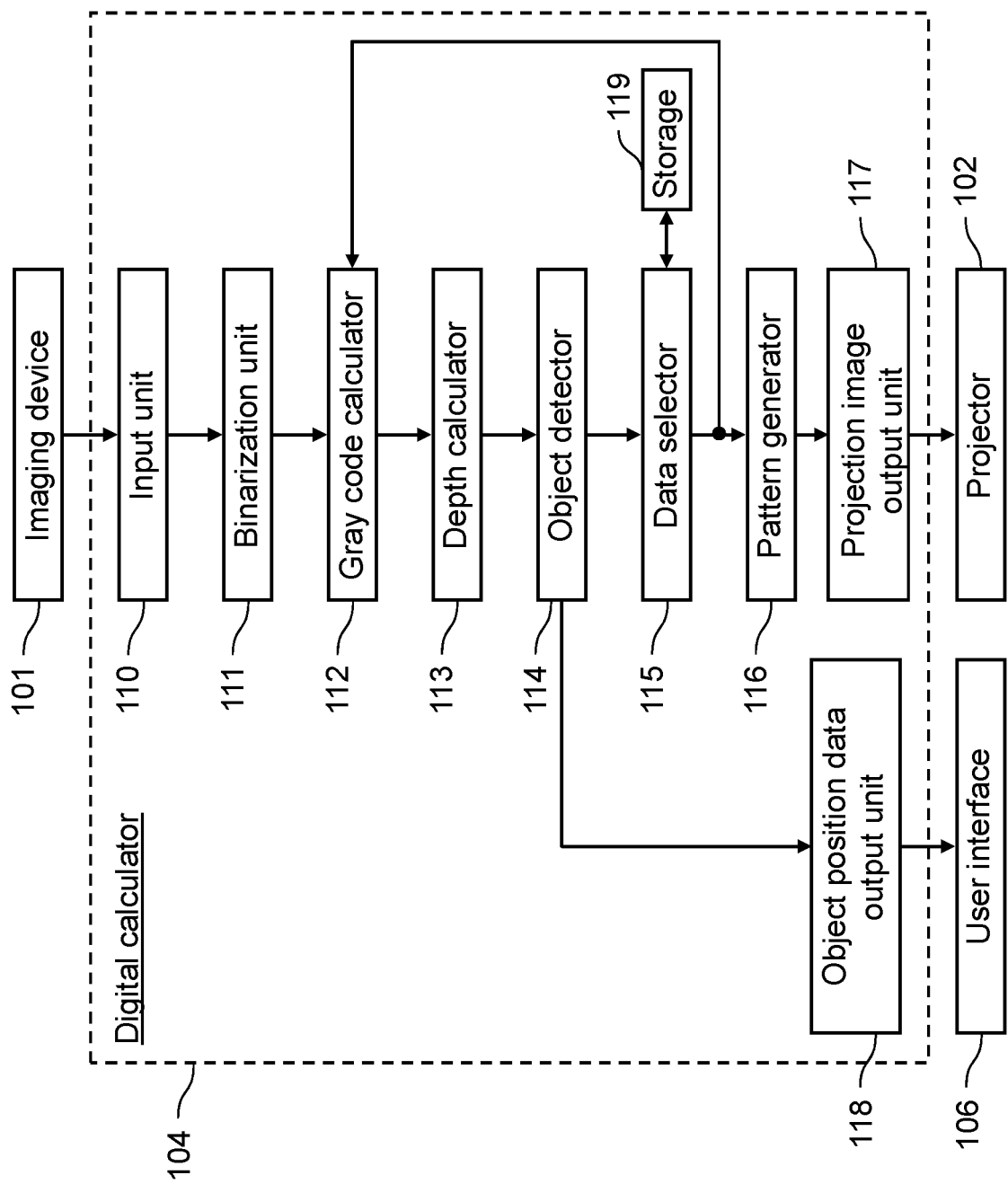
FIG. 3 is a block diagram illustrating a detailed configuration example of digital calculator 104 of FIG. 1.

FIG. 3 is a block diagram illustrating a detailed configuration example of digital calculator 104 of FIG. 1. In FIG. 3, digital calculator 104 includes input unit 110, binarization unit 111, gray code calculator 112, depth calculator 113, object detector 114, data selector 115, pattern generator 116, projection image output unit 117, object position data output unit 118, and storage 119.

In FIG. 3, input unit 110 is configured to sequentially input, into binarization unit 111, an image obtained by imaging wall 105 and object 103 by using imaging device 101. Binarization unit 111 is configured to binarize the inputted image by light and darkness and output the resulting binarized image to gray code calculator 112.

Gray code calculator 112 includes an internal memory configured to store a gray code image. Here, the gray code image is an image having the same pixel size as the captured image, and each pixel of the gray code image include a gray code value expressed by a 10-digit binary number. Gray code calculator 112 is configured to update a gray code image by substituting a value of the inputted binarization image into a digit (bit) corresponding to the present subframe among the gray code values of the pixels of the gray code pattern stored in the internal memory, and to output the updated gray code image to depth calculator 113. Which of the gray code patterns corresponds to the present subframe is determined, based on the order of the gray code patterns inputted from data selector 115.

Depth calculator 113 is configured to determine the depth of each of the pixels by trigonometry, based on the updated gray code image, and output a depth image to object detector 114. Here, the "depth" means a difference between a gray code value in an image imaged in advance when object 103 is not present and a gray code value in the updated gray code image. For example, in the case of a positional relation illustrated in FIG. 1, a gray code value in a direction of object 103 when viewed from imaging device 101 has increased to 500, from 50 where object 103 is not present. Hence, the depth of object 103 is 450. In the present embodiment, the depth is used as an indicator of the distance from wall 105.

Object detector 114 is configured to determine whether or not a target is present in a predetermined depth range in the inputted depth image, and, if present, detect the target as object 103. For example, when a predetermined threshold is 200 in FIG. 1, object 103 with a depth of 450 can be detected.

Furthermore, object detector 114 is configured to output object position data including information on, for example, the coordinates and depth of object 103, via object position data output unit 118 to external user interface 106. In the case where object 103 is not detected, object position data includes information on the absence of object 103 instead. User interface 106 is, for example, a liquid crystal display, and is configured to provide a user with a screen generated based on the object position data.

Data selector 115 is configured to, based on the depth of detected object 103 in one frame, select a gray code pattern arrangement to be used in a subsequent frame from storage 119, and retrieve and output the gray code pattern arrangement to pattern generator 116. Furthermore, data selector 115 is configured to output the order of retrieved gray code patterns to gray code calculator 112.

Storage 119 is configured to store beforehand a plurality of gray code pattern arrangements and a database indicating a relation between a depth threshold for detecting object 103 and the order of the gray code patterns to be used in the subsequent frame. A method for determining the order of the gray code patterns each corresponding to a corresponding one of depths will be described later.

Pattern generator 116 is configured to, based on the order of the gray code patterns outputted from data selector 115, generate 10 gray code pattern images to be projected, and sequentially send the 10 gray code pattern images via projection image output unit 117 to projector 102 to project the 10 gray code pattern images.

This configuration allows digital calculator 104 to detect object 103 in cooperation with imaging device 101 and projector 102 and to provide a user with information on the depth and position of object 103. A method for determining the order of gray code patterns stored in the above-mentioned storage 119 is described below.

FIG. 4 is a table of various examples of gray code pattern arrangements according to a conventional example, comparative examples, and Embodiment 1.

In FIG. 4, gray code pattern arrangement A is a gray code pattern arrangement according to the conventional example. Gray code pattern arrangements B and C are gray code pattern arrangements according to the comparative examples. Gray code pattern arrangements D to F are gray code pattern arrangements according to Embodiment 1, and permutation examples determined based on generation procedures.

In FIG. 4, each of gray code pattern arrangements A to F indicates the order of allocation, that is, which gray code pattern is projected and imaged on which subframe.

In gray code pattern arrangement A of FIG. 4, position detection system 100 allocates a first gray code pattern (bit 1) to a first subframe, allocates a second gray code pattern (bit 2) to a second subframe, allocates a third gray code pattern (bit 3) to a third subframe, allocates a fourth gray code pattern (bit 4) to a fourth subframe, allocates a fifth gray code pattern (bit 5) to a fifth subframe, allocates a sixth gray code pattern (bit 6) to a sixth subframe, allocates a seventh gray code pattern (bit 7) to a seventh subframe, allocates an eighth gray code pattern (bit 8) to an eighth subframe, allocates a ninth gray code pattern (bit 9) to a ninth subframe, and allocates a tenth gray code pattern (bit 10) to a tenth subframe.

Similarly, in gray code pattern arrangement B according to one of the comparative examples, position detection system 100 allocates the first gray code pattern (bit 1) to the first subframe, allocates the third gray code pattern (bit 3) to the second subframe, allocates the fifth gray code pattern (bit 5) to the third subframe, allocates the seventh gray code pattern (bit 7) to the fourth subframe, allocates the ninth gray code pattern (bit 9) to the fifth subframe, allocates the second gray code pattern (bit 2) to the sixth subframe, allocates the fourth gray code pattern (bit 4) to the seventh subframe, allocates the sixth gray code pattern (bit 6) to the eighth subframe, allocates the eighth gray code pattern (bit 8) to the ninth subframe, and allocates the tenth gray code pattern (bit 10) to the tenth subframe.

In gray code pattern arrangement C according to another one of the comparative examples, position detection system 100 allocates the tenth gray code pattern (bit 10) to the first subframe, allocates the ninth gray code pattern (bit 9) to the second subframe, allocates the eighth gray code pattern (bit 8) to the third subframe, allocates the seventh gray code pattern (bit 7) to the fourth subframe, allocates the sixth gray code pattern (bit 6) to the fifth subframe, allocates the fifth gray code pattern (bit 5) to the sixth subframe, allocates the fourth gray code pattern (bit 4) to the seventh subframe, allocates the third gray code pattern (bit 3) to the eighth subframe, allocates the second gray code pattern (bit 2) to the ninth subframe, and allocates the first gray code pattern (bit 1) to the tenth subframe.

In gray code pattern arrangement D according to Embodiment 1, position detection system 100 allocates the tenth gray code pattern (bit 10) to the first subframe, allocates the first gray code pattern (bit 1) to the second subframe, allocates the second gray code pattern (bit 2) to the third subframe, allocates the ninth gray code pattern (bit 9) to the fourth subframe, allocates the third gray code pattern (bit 3) to the fifth subframe, allocates the fourth gray code pattern (bit 4) to the sixth subframe, allocates the eighth gray code pattern (bit 8) to the seventh subframe, allocates the fifth gray code pattern (bit 5) to the eighth subframe, allocates the sixth gray code pattern (bit 6) to the ninth subframe, and allocates the seventh gray code pattern (bit 7) to the tenth subframe.

In gray code pattern arrangement E according to Embodiment 1, position detection system 100 allocates the ninth gray code pattern (bit 9) to the first subframe, allocates the third gray code pattern (bit 3) to the second subframe, allocates the fourth gray code pattern (bit 4) to the third subframe, allocates the eighth gray code pattern (bit 8) to the fourth subframe, allocates the fifth gray code pattern (bit 5) to the fifth subframe, allocates the sixth gray code pattern (bit 6) to the sixth subframe, allocates the seventh gray code pattern (bit 7) to the seventh subframe, allocates the tenth gray code pattern (bit 10) to the eighth subframe, allocates the first gray code pattern (bit 1) to the ninth subframe, and allocates the second gray code pattern (bit 2) to the tenth subframe.

In gray code pattern arrangement F according to Embodiment 1, position detection system 100 allocates the seventh gray code pattern (bit 7) to the first subframe, allocates the sixth gray code pattern (bit 6) to the second subframe, allocates the fifth gray code pattern (bit 5) to the third subframe, allocates the eighth gray code pattern (bit 8) to the fourth subframe, allocates the fourth gray code pattern (bit 4) to the fifth subframe, allocates the third gray code pattern (bit 3) to the sixth subframe, allocates the ninth gray code pattern (bit 9) to the seventh subframe, allocates the second gray code pattern (bit 2) to the eighth subframe, allocates the first gray code pattern (bit 1) to the ninth subframe, and allocates the tenth gray code pattern (bit 10) to the tenth subframe.

Gray code pattern arrangement E is a gray code pattern arrangement having an order in which the first three gray code patterns of gray code pattern arrangement D are relocated to the end. Gray code pattern arrangement F is a gray code pattern arrangement obtained by rearranging the gray code patterns of gray code pattern arrangement D in reverse order.

The above-described gray code pattern arrangement D is generated so as to achieve the same effect whichever subframe in a frame the detection is started at. Accordingly, the same effect is acquired even when, as the gray code pattern arrangement according to Embodiment 1, a gray code pattern arrangement obtained by relocating any number of the gray code patterns from the head of the gray code pattern arrangement according to Embodiment 1 to the end thereof is used. For example, when gray code pattern arrangement E is used, the same effect as in the case of using gray code pattern arrangement D is achieved.

The above-described gray code pattern arrangement D is a gray code pattern arrangement ensuring that the sum of gray code values of a plurality of consecutive gray code patterns in the gray code pattern arrangement is a predetermined value or larger. Accordingly, the same effect is achieved even when, as the gray code pattern arrangement according to Embodiment 1, a gray code pattern arrangement obtained by rearranging the gray code pattern arrangement according to Embodiment 1 in reverse order is used. For example, when gray code pattern arrangement F is used, the same effect as in the case of using gray code pattern arrangement D is achieved.

Figure 5:
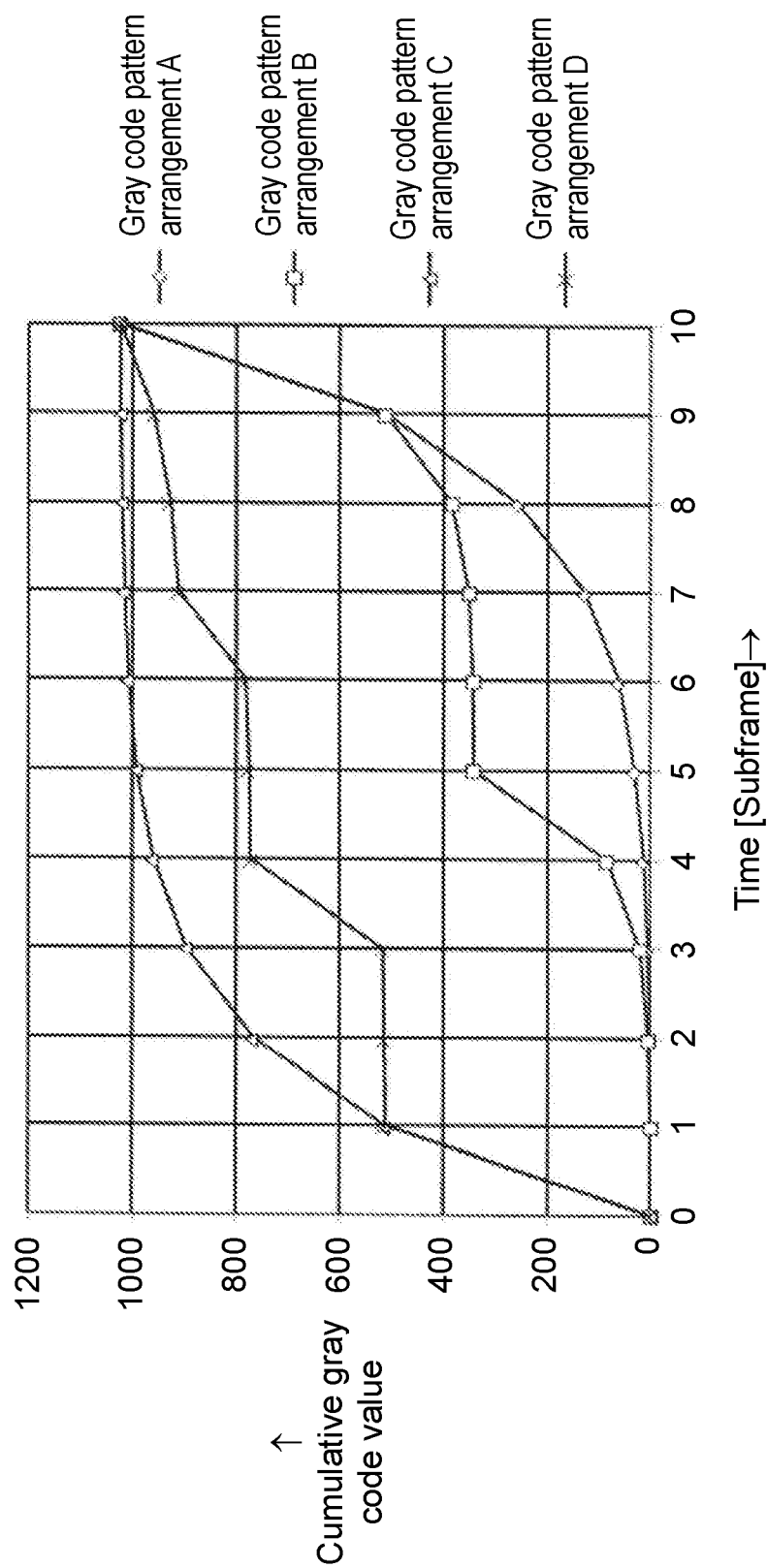
FIG. 5 illustrates graphs of relations between subframes and cumulative gray code values in one frame in position detection system 100 of FIG. 1.

FIG. 5 illustrates graphs of relations between subframes and cumulative gray code values in one frame in position detection system 100 of FIG. 1. In FIG. 5, a cumulative gray code value is the sum of gray code values of gray code patterns at a time point in the frame, and indicates the maximum depth that can be detected at the subframe time point. Four line graphs in FIG. 5 are graphs obtained according to gray code pattern arrangements A to D of FIG. 4, respectively.

For example, a case in which object 103 is detected using a depth threshold of 200 is now taken up. In this case, according to gray code pattern arrangement A of FIG. 4, the cumulative gray code value exceeds 200 at the eighth subframe. Hence, to detect object 103 with a depth value of 200 according to gray code pattern arrangement A, at least 8 subframes are needed. In contrast, according to gray code pattern arrangement B of FIG. 4, the cumulative gray code value exceeds 200 at the fifth subframe. Thus, by the use of an arrangement in which a gray code pattern corresponding to a higher-order bit is allocated to an earlier time point in one frame, object 103 with a certain depth can be detected earlier.

Here, according to a gray code pattern arrangement that is the reverse of gray code pattern arrangement A, such as gray code pattern arrangement C of FIG. 4, in the case of a depth threshold of 511 or smaller, object 103 can be detected at the first subframe, as illustrated in FIG. 5. However, detection of object 103 is not always started at the first subframe. For example, in the case where object 103 appears for the first time in an imaging region at the fourth subframe, gray code patterns corresponding to the first to third subframes do not contributed to the detection. Hence, in the case of a depth threshold of 200, according to gray code pattern arrangement C, the detection needs 8 subframes (until the first subframe of the subsequent frame). A description is given below of a gray code pattern arrangement that allows object 103 to be detected with the least number of subframes even when object 103 appears in the imaging region in the middle of a frame.

First, subframes in one frame are divided into a plurality of subframe groups. This division into the subframe groups is such that the sum of gray code values of subframes included in each of the subframe groups is equal to or larger than a depth threshold. Thus, even in the case where object 103 appears in the imaging region in the middle of the frame, when a value of the depth is larger than the depth threshold, object 103 can be detected through a lapse of all the subframes included in at least one of the subframe groups.

A specific method for the above-mentioned division is described below. For the further generalization of the method, a description is given of a case in which N subframes are included in one frame. Here, N subframes include one subframe corresponding to a highest-order gray code pattern and M subframe groups each including Nsfg subframes. That is, the following Equation (1) holds true, where N, Nsfg, and M are independently a natural number equal to or larger than 2.

$$N = Nsfg \times M + 1 \quad (1)$$

As is the case with the tenth gray code pattern 200a of FIG. 2, the highest-order, namely the Nth gray code pattern is a pattern formed of a left half being 0 (black) and a right half being 1 (white), and has a gray code value of $2^{N-1}$. The (N−1)th gray code pattern is a pattern formed of four parts obtained by laterally splitting a whole into four, the four parts being black, white, black, and white respectively in an order from left to right, and has a gray code value of $2^{N-2}$. Similarly, in the following bits, gray code patterns to be user are such that the width is reduced by half every bit increase. The lowest-order, namely the first gray code pattern (bit 1) is a pattern in which 2N−1 black bars and 2N−1 white bars alternately appear, and has a gray code value of 1.

Thus, a gray code in any gray code pattern is expressed as a power of two. A gray code value of the n-th gray code pattern is larger than the sum of gray code values of the first to the (n−1)th gray code patterns, wherein n satisfies 1≤n≤N. That is, the following expression holds true.

$$GC(n) > \sum_{m=1}^{n-1} GC(m) \quad \text{[Expression 1]}$$

In the expression above, GC (m) is a gray code value of the m-th gray code pattern. Accordingly, in the case where both the lowest-order gray code pattern and the highest-order gray code pattern are included in the same subframe group, the sum of gray code values in the subframe group is larger than the sum of gray code values in any of other subframe groups. Therefore, a subframe group including the highest-order gray code pattern is forced to include lower (Nsfg−1) gray code patterns.

Similarly, the same procedure is repeated also for each of the remaining subframes, by which one subframe group is forced to include the highest-order gray code pattern in the remaining subframes and lower (Nsfg−1) gray code patterns, so that the minimum value of the sums of gray code values in the subframe groups can be kept at a maximum.

Note that a time point at which object 103 appears in the imaging region is possibly in the middle of a subframe group. In this case, cumulative gray code values of two consecutive subframe groups are summed up. Hence, there is a possibility that, in the two subframe groups, without including a subframe corresponding to a higher-order gray code pattern in each of the subframe groups, object 103 is detected. In this case, the cumulative gray code values more slowly increase, so that it takes a longer time to detect object 103, compared with a case in which the higher-order gray code pattern is included. Therefore, in the case where the detection is performed across two subframe groups, a higher-order gray code pattern in any of the subframe groups is forced to be always included. Specifically, it is beneficial that, in all subframe groups, a higher-order gray code pattern in each of the subframe groups is allocated to the first subframe of the subframe group.

Here, in the case where subframe groups are generated with the above-described procedure, the sum of gray code values of lower-order gray code patterns in a first-generated subframe group (in which a higher-order gray code pattern has a largest gray code value) is smaller than the sum of gray code values of lower-order gray code patterns in any of other subframe groups. Accordingly, when the first-generated subframe group is adjacent to another subframe group, detection performed across these two subframe groups is slower. Therefore, the highest-order gray code pattern is allocated to the first subframe of a frame, and the first-generated subframe group is allocated to the end of the frame. Thus, a subframe group having a minimum sum of gray code values of lower-order gray code patterns is always adjacent to a subframe having the highest-order gray code pattern (in the next frame), so that detection across two frames can be performed at higher speed.

According to the above-described method for generating an arrangement, whenever the detection is started, a gray code pattern arrangement by which the sum of gray code values is equal to or larger than a predetermined value is obtained through a lapse of one subframe group.

Next, a description is given of an arrangement in the case where Equation (1) assumed in the above description does not hold true. Hence, the number of subframes N divided by the number of subframe groups M gives Nquo and remainder Nmod. In other words, it is assumed that N=Nquo×M+Nmod.

First, using the same procedure as the case in which Equation (1) holds true, (Nquo−1) subframe groups are generated. There are used the highest-order gray code pattern in a frame; higher (Nquo−1) gray code patterns, other than the highest-order gray code pattern; and lower ((Nquo−1)×(Nsfg−1)) gray code patterns to be used in combination with the above-mentioned highest-order and higher-order gray code patterns. In other words, by using, among all gray code patterns in a frame, top Nquo bits and bottom ((Nquo−1)×(Nsfg−1)) bits, a subframe group is generated in the same manner as in the case in which Equation (1) holds true. At this time point, (N−Nsfg×M−1) subframes are not included in the subframe group, and these subframes are referred to as a surplus subframe group. Middle-order gray code patterns that have not been allocated yet are respectively allocated to the subframes of the surplus subframe group. The number of the subframes in the surplus subframe group can be expressed also as (Nsfg+Nmod−1).

Hereinafter, the middle-order gray code patterns are expressed as P(1), P(2), . . . , P(Nsfg+Nmod−1) in descending order from the highest-order. As described above, each of the gray code patterns has a gray code value being a power of two, and hence, the sum of gray code values of the middle gray code patterns is smaller than the sum of gray code values of any of other subframe groups. Accordingly, a gray code pattern arrangement that allows the minimum value of the sums of gray code values of Nsfg consecutive middle-order gray code patterns out of the middle-order gray code patterns to be maximized is now taken up.

Figure 6:
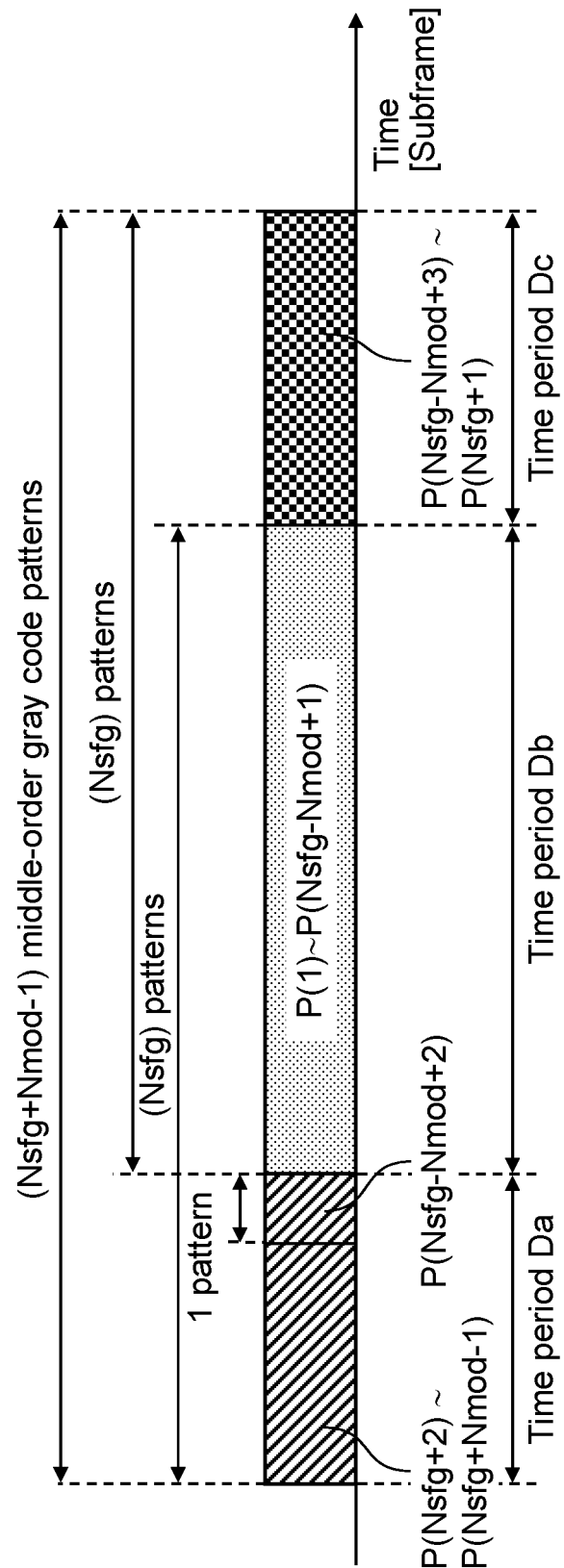
FIG. 6 is a timing chart for describing a middle-order gray code pattern arrangement according to Embodiment 1.

FIG. 6 is a timing chart for describing a middle-order gray code pattern arrangement according to Embodiment 1. The middle-order gray code patterns include (Nsfg+Nmod−1) subframes. From these subframes, Nsfg consecutive subframes are taken. As for values of the subframes, the following Inequality (2) holds true.

$$Nsfg+N \bmod -1 < 2Nsfg \quad (2)$$

Hence, whichever Nsfg consecutive subframes are selected from the subframes of the middle-order gray code patterns, there are subframes that are always included in the Nsfg consecutive subframes. The number of such subframes can be expressed by the following expression.

$$2Nsfg-(Nsfg+N \bmod -1)=Nsfg-N \bmod +1$$

The middle-order subframes are divided into the first (Nmod−1) subframes (time period Da) of a frame, the last (Nmod−1) subframes (time period Dc), and (Nsfg−Nmod+1) subframes (time period Db) other than the first (Nmod−1) and last (Nmod−1) subframes. The subframes included in time period Db are the above-mentioned subframes that are always included in the Nsfg consecutive subframes.

Gray code patterns in time period Db each have preferably a larger gray code value because the gray code patterns are used for detection whenever the detection is started. Therefore, higher (Nsfg−Nmod+1) middle-order gray code patterns among the middle-order gray code patterns, namely, P(1) to P(Nsfg−Nmod+1) are forced to be included in time period Db. The (Nsfg−Nmod+1) middle-order gray code patterns are an example of "a first middle-order subgroup".

The remaining gray code patterns P(Nsfg−Nmod+2) to P(Nsfg+Nmod−1) are divided into two in the same manner as in the case of generating a subframe group. In other words, the highest-order gray code pattern P(Nsfg−Nmod+2) and lower-order (Nmod−2) gray code patterns P(Nsfg+2) to P(Nsfg+Nmod−1), are assigned to time period Da, while the remaining (Nmod−1) gray code patterns P(Nsfg−Nmod+3) to P(Nsfg+1) are assigned to time period Dc. Here, the highest-order gray code pattern P(Nsfg−Nmod+2) is allocated to the end of time period Da. Here, the highest-order gray code pattern P(Nsfg−Nmod+2) is an example of "a second middle-order subgroup"; the lower-order (Nmod−2) gray code patterns are an example of "a fourth middle-order subgroup"; and the remaining (Nmod−1) gray code patterns are an example of "a third middle-order subgroup".

The subframe groups of the middle-order gray code patterns generated as described above are allocated between the highest-order subframe in a frame and the highest-order subframe in the first subframe group that are adjacent to each other. Accordingly, between time period Da and time period Dc, a subframe to which a lower-order gray code pattern is allocated and a subframe to which the highest-order gray code pattern is allocated are adjacent to each other, so that lower-order gray code patterns can be prevented from being in consecutive order.

In the gray code pattern arrangement generated as described above, the depth at which object 103 can be detected varies with the number of subframes Nsfg in one subframe group. For example, when the number of subframes N in one frame is ten and the number of subframes Nsfg is three, a gray code pattern arrangement {10,1,2,9,3,4,8,5,6,7} (gray code pattern arrangement D of FIG. 4) is obtained as an example. Note that, as is the case with FIG. 4, the numerical values of the arrangement indicate which gray code pattern is allocated to which subframe. By the use of this gray code pattern arrangement, whichever time point in a frame the detection is started at, a cumulative gray code value is equal to or larger than (24+25+26)=112 through a lapse of three subframes. That is, object 103 with a depth less than 112 is detected within three subframes.

Therefore, the minimum cumulative gray code value described above is determined for the number of subframes Nsfg and taken as a depth threshold, and in the case where the depth of an object to be detected exceeds the threshold, a gray code pattern arrangement generated by the use of a corresponding number of subframes Nsfg is selected for change, so that an optimum gray code pattern arrangement for the depth of object 103 can be used. Note that, in the case where a gray code pattern arrangement is generated with the above-described procedure, the minimum cumulative gray code value for a certain number of subframes Nsfg is as follows.

(a) In the case where Equation (1) holds true, the minimum cumulative gray code value for the certain number of subframes Nsfg is the sum of gray code values of gray code patterns corresponding to subframes in a subframe group including the lowest gray code pattern out of higher-order gray code patterns.

(b) In the case where Equation (1) does not hold true, the minimum cumulative gray code value for the certain number of subframes Nsfg is the sum of gray code values of gray code patterns included in the middle-order subgroups.

FIG. 7 illustrates graphs of relations between the number of subframes Nsfg included in one subframe group and the minimum value of the sums of gray code values of Nsfg consecutive subframes, according to the conventional example and Embodiment 1. The graph with a solid line is a graph showing a case in which an arrangement is made in accordance with a permutation generated with the procedure of the present disclosure. It can be said that the vertical axis represents the maximum depth that can be detected for the number of subframes Nsfg included in one subframe group.

Therefore, it is beneficial that, with respect to a depth of object 103 detected in a previous frame, the number of subframes Nsfg is set so as to be, a minimum number of subframes Nsfg that enables the detection of object 103 with the depth. In other words, the maximum of the depths that can be detected in the numbers of subframes is taken as a depth threshold, and when a depth of object 103 exceeds the depth threshold, the number of subframes Nsfg is changed.

In FIG. 7, the graph with a dotted line is a graph showing a case in which object 103 is detected in accordance with the arrangement A, regardless of the depth of object 103. It is found that the depth of object 103 that can be detected with the same number of subframes is in a wider range. In other words, when detection is started at an arbitrary subframe in a frame, the position detection system of the present embodiment is capable of detecting object 103 with a certain depth at higher speed, compared with the prior arts.

Note that, in Embodiment 1, instead of generating a gray code pattern image by pattern generator 116, 10 gray code pattern images may be stored in storage 119 in advance, and data selector 115 may retrieve and output the 10 gray code pattern images to projector 102 via projection image output unit 117. Furthermore, in an order to perform detection across two subframe groups at higher speed, in every subframe group, the highest-order gray code pattern of the subframe group is allocated to the first subframe, but, the highest-order gray code pattern may be allocated to the last subframe. In this case, the highest-order gray code pattern in a frame is allocated to the end of the frame, and in the case where a middle-order gray code pattern is present, the middle-order gray code pattern is allocated between the highest-order gray code pattern of the last subframe group and the highest-order gray code pattern of the frame.

Furthermore, in the gray code pattern arrangement in Embodiment 1, whichever Nsfg consecutive subframes are selected, a part including a higher-order gray code pattern than in the Nsfg consecutive subframes is always present. Accordingly, in the part, a permutation does not affect the operation of the position detection system, and therefore any permutation may be allowed. Hence the permutation is not limited to a particular one.

As described above, according to Embodiment 1, a gray code pattern arrangement to be used is selected, depending on the depth of object 103 detected in a previous frame. Furthermore, the gray code pattern arrangement is determined in such a manner that, whichever subframe in a frame the detection is started at, a cumulative gray code value becomes equal to or larger than a predetermined value after a lapse of predetermined subframes. In this gray code pattern arrangement, gray code patterns are arranged in ascending and then descending or descending and then ascending order of gray code values. Thus, object 103 with any depth can be detected at higher speed, compared with the prior arts.

INDUSTRIAL APPLICABILITY

The present invention can be used to detect an object present within a predetermined range at high speed, and, for example, is applicable to projection mapping and hazard sensors of automobiles.

What is claimed is:

1. A position detection system configured to detect a position of an object by using a plurality of frames, each of the plurality of frames being divided into a plurality of subframes, the position detection system comprising:
  a projector configured to project a plurality of gray code patterns having different gray code values in an order of ascending and then descending or descending and then ascending of the different gray code values, each of the plurality of gray code patterns corresponding to a corresponding one of the plurality of subframes, each of the different gray code values being a power of two;
  an imaging device configured to generate a captured image by, for each of the plurality of subframes, imaging the object on which the plurality of gray code patterns are projected;
  a controller configured to estimate the position of the object based on the captured image; and
  a storage configured to store beforehand a plurality of different arrangements each having the plurality of gray code patterns,
  wherein the projector projects the gray code patterns in accordance with one arrangement selected from the plurality of different arrangements by the controller,
  wherein the controller estimates the position of the object by detecting a target in a predetermined depth range of the object,
  wherein the subframes are N subframes, including:
    one subframe to which a highest-order gray code pattern among the plurality of gray code patterns having a largest gray code value of the different gray code values is allocated; and
    M subframe groups each including Nsfg subframes, wherein N, Nsfg, and M are independently a natural number equal to or larger than 2,
  wherein (N−1) gray code patterns other than the highest-order gray code pattern include:
    M higher-order gray code patterns among the plurality of gray code patterns in descending gray-code-value order; and
    (Nsfg−1)×M lower-order gray code patterns among the plurality of gray code patterns in ascending gray-code-value order,
  wherein each of the M subframe groups is a combination of a corresponding one gray code pattern extracted in descending order from the higher-order gray code patterns and corresponding (Nsfg−1) gray code pattern extracted in ascending order from the lower-order gray code patterns, and
  wherein, in a subframe group of the M subframe groups, the subframe group including a lowest of the higher-order gray code patterns, a sum of gray code values of gray code patterns respectively corresponding to subframes is a threshold of the depth when an arrangement among the plurality of different arrangements of the plurality of gray code patterns is selected to change the order.

2. The position detection system according to claim 1, wherein the projector projects the plurality of gray code patterns arranged in the order by the controller, and
wherein the controller arranges the plurality of gray code patterns in accordance with a predetermined arrangement, an arrangement being a reverse of the predetermined arrangement, or an arrangement obtained by relocating an arbitrary number of the gray code patterns from a head of the predetermined arrangement to an end of the predetermined arrangement.

3. The position detection system according to claim 1, wherein the highest-order gray code pattern is allocated to a first subframe of the plurality of subframes; the M subframe groups are arranged in descending order from a subframe group including a highest of the higher-order gray code patterns; and the higher-order gray code patterns are respectively allocated to a last subframe in the M subframe groups.

4. The position detection system according to claim 1, wherein the highest-order gray code pattern is allocated to a last subframe of the plurality of subframes; the M subframe groups are arranged in ascending order from the subframe group including the lowest of the higher-order gray code patterns; and the higher-order gray code patterns are respectively allocated to a first subframe in the M subframe groups.

5. The position detection system according to claim 3, wherein the plurality of subframes further include a surplus subframe group including (N−Nsfg×M−1) subframes,
wherein the (N−1) gray code patterns other than the highest-order gray code pattern further includes (N−Nsfg×M−1) middle-order gray code patterns allocated to the surplus subframe group, and
wherein the middle-order gray code patterns are inserted and arranged between the highest-order gray code pattern and a lowest of the higher-order gray code patterns.

6. The position detection system according to claim 4, wherein the plurality of subframes further include a surplus subframe group including (N−Nsfg×M−1) subframes,
wherein the (N−1) gray code patterns other than the highest-order gray code pattern further includes (N−Nsfg×M−1) middle-order gray code patterns allocated to the surplus subframe group, and
wherein the middle-order gray code patterns are inserted and arranged between the highest-order gray code pattern and a lowest of the higher-order gray code patterns.

7. The position detection system according to claim 5, wherein the middle-order gray code patterns include (Nsfg+Nm) gray code patterns, wherein Nm is a natural number,
wherein, when the middle-order gray code patterns are divided into, in descending order from a highest of the middle-order gray code patterns,
(A) a first middle-order subgroup including an (Nsfg−Nm) gray code pattern(s),
(B) a second middle-order subgroup that is subsequent to the first middle-order subgroup and includes one gray code pattern,
(C) a third middle-order subgroup that is subsequent to the second middle-order subgroup and includes an Nm gray code pattern(s), and
(D) a fourth middle-order subgroup including remaining an (Nm−1) gray code pattern(s),
the middle-order gray code patterns are arranged
(1) in an order of the fourth, the second, the first, and the third middle-order subgroups, or
(2) in an order of the third, the first, the second, and the fourth middle-order subgroups.

8. The position detection system according to claim 6, wherein the middle-order gray code patterns include (Nsfg+Nm) gray code patterns, wherein Nm is a natural number,
wherein, when the middle-order gray code patterns are divided into, in descending order from a highest of the middle-order gray code patterns,
(A) a first middle-order subgroup including an (Nsfg−Nm) gray code pattern(s),
(B) a second middle-order subgroup that is subsequent to the first middle-order subgroup and includes one gray code pattern,
(C) a third middle-order subgroup that is subsequent to the second middle-order subgroup and includes an Nm gray code pattern(s), and
(D) a fourth middle-order subgroup including remaining an (Nm−1) gray code pattern(s), the middle-order gray code patterns are arranged
(1) in an order of the fourth, the second, the first, and the third middle-order subgroups, or
(2) in an order of the third, the first, the second, and the fourth middle-order subgroups.

9. The position detection system according to claim 1, wherein a minimum value of sums, each of the sums being sum of gray code values of gray code patterns corresponding to Nsfg consecutive subframes in each of the plurality of frames, is a threshold of the depth when an arrangement among the plurality of different arrangements of the plurality of gray code patterns is selected to change the order.

10. The position detection system according to claim 7, wherein a sum of gray code values of the gray code patterns included in the first and the third middle-order subgroup is a threshold of the depth when an arrangement among the plurality of different arrangements of the plurality of gray code patterns is selected to change the order.

11. The position detection system according to claim 8, wherein a sum of gray code values of the gray code patterns included in the first and the third middle-order subgroups is a threshold of the depth when an arrangement among the plurality of different arrangements of the plurality of gray code patterns is selected to change the order.

12. A position detection method for a position detection system, the position detection system being configured to detect a position of an object by using a plurality of frames, each of the plurality of frames being divided into a plurality of subframes, the position detection method comprising:
arranging a plurality of gray code patterns having different gray code values in an order of ascending and then descending or descending and then ascending of the different gray code values, each of the plurality of gray code patterns corresponding to a corresponding one of the plurality of subframes, each of the different gray code values being a power of two;
projecting the plurality of gray code patterns onto the object in the order;
generating a captured image by, for each of the plurality of subframes, imaging the object on which the plurality of gray code patterns are projected;
estimating the position of the object based on the captured image; and
storing beforehand a plurality of different arrangements each having the plurality of gray code patterns,
wherein the projecting includes projecting the gray code patterns in accordance with one arrangement selected from the plurality of different arrangements,
wherein the estimating includes estimating the position of the object by detecting a target in a predetermined depth range of the object,
wherein the subframes are N subframes, including:
one subframe to which a highest-order gray code pattern among the plurality of gray code patterns having a largest gray code value of the different gray code values is allocated; and M subframe groups each including Nsfg subframes, wherein N, Nsfg, and M are independently a natural number equal to or larger than 2, wherein (N−1) gray code patterns other than the highest-order gray code pattern include:
  M higher-order gray code patterns among the plurality of gray code patterns in descending gray-code-value order; and
  (Nsfg−1)×M lower-order gray code patterns among the plurality of gray code patterns in ascending gray-code-value order, wherein each of the M subframe groups is a combination of a corresponding one gray code pattern extracted in descending order from the higher-order gray code patterns and corresponding (Nsfg−1) gray code pattern extracted in ascending order from the lower-order gray code patterns, and wherein, in a subframe group of the M subframe groups, the subframe group including a lowest of the higher-order gray code patterns, a sum of gray code values of gray code patterns respectively corresponding to subframes is a threshold of the depth when an arrangement among the plurality of different arrangements of the plurality of gray code patterns is selected to change the order.

\* \* \* \* \*